W. Billinghurst,
Fishing-Line Reel,
№ 24,987.
Patented Aug. 9, 1859.
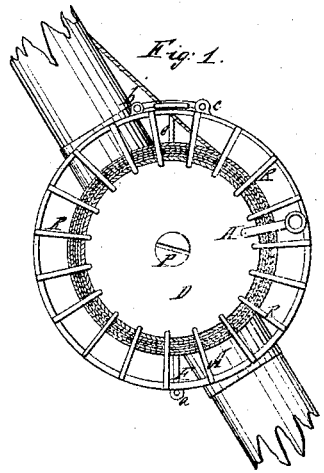
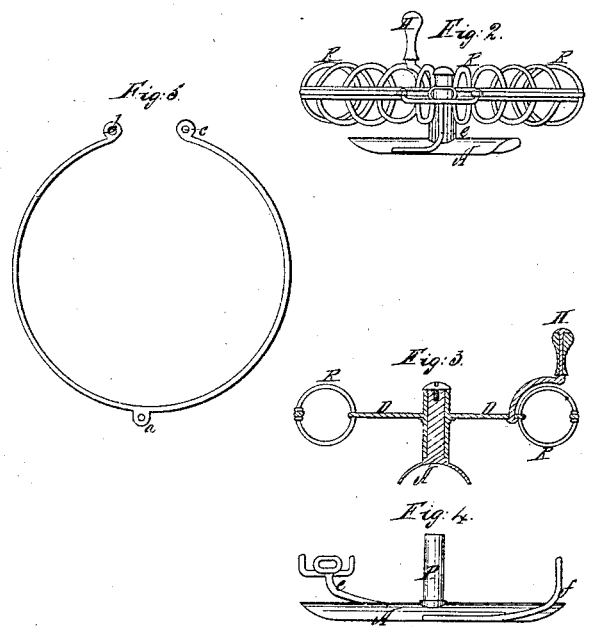
Witnesses:
Inventor:

UNITED STATES PATENT OFFICE.

WILLIAM BILLINGHURST, OF ROCHESTER, NEW YORK.

FISHING-REEL.

Specification forming part of Letters Patent No. 24,987, dated August 9, 1859.

*To all whom it may concern:*

Be it known that I, WILLIAM BILLINGHURST, of the city of Rochester, in the county of Monroe and State of New York, have made and invented certain new and useful Improvements in Fishing-Reels, of which the following is a full and accurate description, reference being had to the accompanying drawings, making part of this specification, and to the letters of reference marked thereon, same letters referring to like parts in all the figures of said drawings.

Figure 1 is a plan of my improved reel as attached to a section of fish-pole and half filled with line. Fig. 2 is a side elevation. Fig. 3 is a section, and Figs. 4 and 5 are details, showing the construction of several parts.

The nature of this invention consists in so constructing the reel that when the line is wound up it shall form a ring instead of a cylinder, thus providing efficiently for its drying without the necessity of unwinding the line and spreading it out, while at the same time the weight and cost of the reel are very much reduced.

The construction of my improved reel is as follows: From the plate A, (shown in detail in Fig. 4,) by means of which it is attached to the rod or pole in the usual manner, projects the stud or pin P. Upon this stud the disk D rotates by its central bearing, as seen in Fig. 3, and carries on its periphery the divided rings R R R. These rings being divided, as shown in the drawings, and arranged as seen in Figs. 1, 2, and 3, form the skeleton of a tubular ring, in the inside of which the line is very easily coiled, being admitted during the rotation of the skeleton ring through the openings left by dividing the rings R R.

The handle H serves to rotate the disk D, and with it, of course, the tubular ring.

Partly to guide and brace the tubular ring during its revolutions, but chiefly to guide the line in its winding and unwinding and prevent the escape of any loose coil if such should exist, the opening formed by dividing the rings is filled in all but a small portion of its extent by means of the ring *a b c*. (Shown separately in Fig. 5.) This ring is held in place and kept from rotating by means of the braces *e* and *f*, which are attached to the plate A, as seen in Fig. 4, the points of the braces passing into the holes or loops *a b c* in the ring, Fig. 5. One of these braces is forked, and has attached a loop or guide, through which the line passes. This loop is seen in Figs. 1 and 2, and more distinctly in Fig. 4. This loop may, of course, be of any size and placed in any position; but by placing it a little to one side of the line of attachment to the rod, as seen in Fig. 1, the line is led from the rod to the coil in the direction of a tangent, so that there is very little strain caused by tension on the line, which is also laid on more evenly and pleasantly than it would be if it passed onto the reel in a radial direction.

The mode of action of this reel is obvious from the foregoing description, and the advantages are numerous and important.

Aside from the great reduction in weight and cost over a reel constructed in the ordinary manner, the general form is much more convenient for carriage in the pocket, as the whole thing, line and all, forms a flat disk of no very great dimensions and which lies snug and close to the person; but the great advantage consists in the complete exposure of the line, whereby it is enabled to dry rapidly and thoroughly. In the common form, when the line on the reel becomes wet, which it is very certain to do, either from complete submersion or from winding wet portions of the line over it, it is impossible for the central portions of the line to dry, covered, as they are, by the outer layers; but in my improved reel there is but a small portion of the line covered, and the whole surface is fully exposed to the air. Hence the whole line dries rapidly and thoroughly, and is thus prevented from decaying, as well as being made much more pleasant.

Another important feature consists in the rapidity with which the line can be wound, thus enabling us to dispense with complicated and expensive gearing for that purpose. In the common form of reel, without gearing, each turn of the handle does not at first take up more than three-quarters of an inch of line. In a reel of the same size as that shown in the drawings hereto annexed the first turn of the handle takes up more than seven inches of line, or nearly ten times the amount taken up by one turn of the common reel-handle.

Having thus described my invention, what I claim therein as new, and desire to secure by Letters Patent, is—

The combination of the skeleton ring R R with the other parts of the reel, the whole being arranged in the manner and for the purpose substantially as set forth.

WM. BILLINGHURST.

Witnesses:
JOHN RHIN,
T. K. ABBOTT.